June 13, 1950 S. E. WESTMAN 2,511,488
HYDRAULIC BRAKE VALVE
Filed June 22, 1945

INVENTOR.
SYDNEY E. WESTMAN
BY E. Woodbury
ATTORNEY

Patented June 13, 1950

2,511,488

UNITED STATES PATENT OFFICE 2,511,488

HYDRAULIC BRAKE VALVE

Sydney E. Westman, North Hollywood, Calif., assignor to Bendix Aviation Corporation, South Bend, Ind., a corporation of Delaware Application June 22, 1945, Serial No. 600,951

17 Claims. (Cl. 303—54)

This invention relates to valves for use in power brake systems using a pressure supply of fluid, as distinct from systems in which the pressure to actuate the brakes is developed by actuation of a master piston.

It is usual in power brake systems to employ a pedal-operated valve having a reaction piston, for admitting pressure fluid to the brakes and releasing it from the brakes, the pressure applied to the brakes by the valve being also applied to the reaction piston so that opening movement of the valve is opposed by the pressure delivered to the brakes and the operator can "feel" the extent of the braking force applied, as in a conventional hydraulic brake system.

An objectionable feature of power brake valves that have been previously employed is that the pressure applied to the reaction piston has been the pressure delivered to the line leading to the brakes instead of the pressure existing at the brakes themselves. When the brakes are first applied by opening the valve, fluid rushes very rapidly through the line, or lines, leading from the valve to the brakes, and, because of the rapid flow and the length and size of the lines, there is usually a very substantial pressure drop in the lines. This gives a false indication to the operator since he "feels" not the actual pressure existing in the brakes, but that pressure plus the pressure drop in the line. Of course, after the brakes have filled and rapid flow through the lines ceases, there is no longer any appreciable pressure drop in the lines and the pressure against the reaction piston is substantially the same as that existing at the brakes.

It is objectionable to have the pressure applied to the reaction piston more than that existent in the brake cylinders during the filling period because it reduces the rate of flow through the valve in the following way:

The operator is used to "feeling" a certain reaction on the brake pedal, and he tends to press just hard enough to develop the expected reaction. Thus, if in order to develop the desired braking effect a pressure of 500 p. s. i. is required at the brakes, the operator knows from experience about what reaction that pressure produces on the brake pedal and presses just hard enough to develop it. When he first applies the brake under these conditions, the 500 p. s. i. pressure that he "feels" exists in the valve, but there may be a 400- or 500-pound pressure drop in the lines leading to the brakes during the filling period, with the result that the valve is initially opened only far enough to develop the 500-pound pressure in the valve itself. On the other hand, if at all times the pressure acting on the reaction piston were comparable to the pressure actually existent at the brakes, the operator would press the pedal far enough to fully open the valve during the filling or charging period, thereby substantially reducing the time required to charge the brakes.

An object of this invention is to provide a power-brake valve in which the pressure applied to the reaction piston approximates the pressure at the brakes irrespective of pressure drop in the line.

Another object is to provide a power-brake valve that is responsive both to the pressure and to the rate of flow of fluid at the valve, to compensate for the drop in pressure in the line.

Other more specific objects and features of the invention will appear from the detailed description to follow.

Briefly, I compensate for the effect on the reaction piston of the pressure drop in the line by producing a corresponding pressure drop within the valve itself and applying this corresponding pressure drop to the reaction piston. In one embodiment of the invention the pressure drop is produced by means of a Venturi passage through which the fluid flows to the brakes, the pressure at the throat of the venturi being applied to the reaction piston. In another embodiment of the invention the effect of the pressure drop in the line on the reaction piston is compensated by producing a pressure drop within the valve itself by means of a restricted orifice and applying this pressure drop to a compensating face on the reaction piston.

Figure 1:
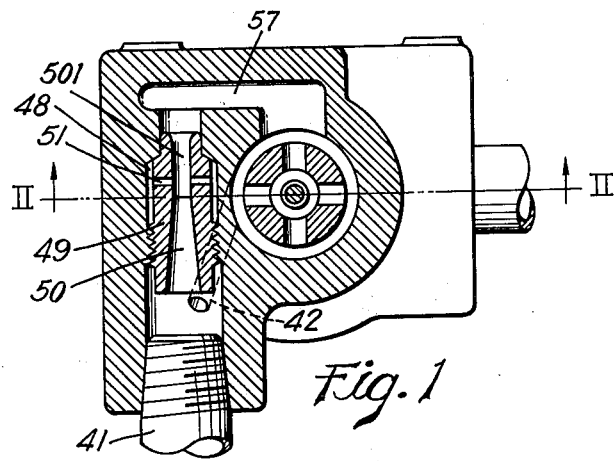
Fig. 1 is a cross section through a preferred valve in accordance with the invention employing a Venturi passage for compensation, the section being taken in the plane I—I of Fig. 2.
Figure 2:
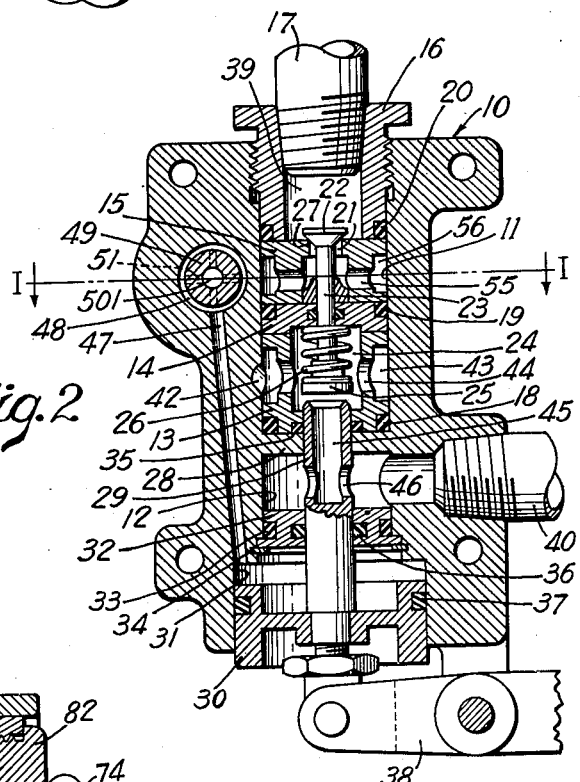
Fig. 2 is a longitudinal section taken in the plane II—II of Fig. 1.

Referring first to the modification shown in Figs. 1 and 2, the valve comprises a body 10 having a cylindrical bore 11 extending thereinto from one end and a cylindrical bore 12 extending thereinto from the other end.

Mounted within the bore 11 in sealing engagement therewith is a valve assembly comprising a guide element 13, a guide element 14, and a guide seat element 15 which are held in place by a bushing 16 securing into the outer end of bore 11, which bushing receives a pipe 17 adapted to be connected to a source of pressure fluid. The elements 13, 14, and 15 are sealed with the bore 11 by gaskets 18, 19, and 20 to prevent leakage of fluid therepast. The seat element 15 has a central orifice 21 which is normally closed by a poppet valve 22 having a stem 23 which is guided in the elements 14 and 15 and extends into a chamber 24 in the element 13. At its lower end, the valve stem 23 has secured thereto an enlarged head 25, and a helical spring 26 is compressed between the head 25 and the element 14 to normally hold the poppet 22 against a seat 27 defined by the upper edge of the orifice 21.

The bore 12 is separated from the bore 11 by a partition wall 28 and this partition wall and the element 13 have aligned holes through which a stem 29 projects, this stem 29 being secured to a reaction piston 30 which is slidable in an enlarged bore 31 below the bore 12. The lower end of bore 12 is closed by a bushing 32 through which the stem 29 also extends. The bushing 32 is retained in position by a snap ring 34 and is sealed with respect to the bore 12 by a sealing ring 33. Sealing rings 35 and 36 seal the stem 29 with respect to the element 13 and the bushing 32 respectively. Sealing ring 37 provides a seal between the reaction piston 30 and the bore 31. The valve is operated by shifting the reaction piston 30 by means of any suitable linkage (preferably including a spring) connecting it with a brake pedal or brake lever, a portion of a brake lever 38 being shown in Fig. 2.

As previously indicated, the pipe 17 is connected to a source of fluid pressure so that fluid pressure is always applied to a chamber 39 immediately above the poppet valve 22. The bore 12 is connected to a return pipe 40 through which exhaust fluid escapes at low pressure. In practice, the pressure supply system comprises a reservoir from which fluid is pumped to the pipe 17, and the pipe 40 may return to the reservoir. A delivery pipe 41 (Fig. 1) extends to the brakes. The remainder of the structure will be described in connection with the operation.

Fig. 2 shows the valve in closed position, at which time the poppet 22 rests against the seat 27 to prevent escape of pressure fluid from the chamber 39. At the same time, the delivery pipe 41 is connected by a passage 42 in the body 10 to the bore 11 adjacent the element 13, the latter having an external groove therein defining an annular passage 43 which is connected by passages 44 in the element 13 to the chamber 24 therewithin, and chamber 24 is connected through a passage 45 and ports 46, in the stem 29, with the bore 12, which is connected to the return line 40. Therefore, when the valve is in the normal position shown, fluid is free to return from the brake line 41 through the passage 42, the annular passage 43, ports 44, passage 45, and ports 46 to the return line 40.

When the brake is to be applied, the lever 38 is rocked clockwise by actuation of a brake pedal or brake lever, to shift the reaction piston 30 upwardly. Upward movement of the reaction piston is initially unopposed by fluid pressure because the bore 31 is connected by a passage 47 to an annular space 48 (Fig. 1) defined between a draft tube 49 and a bore in the body in which the draft tube is mounted. The draft tube contains a Venturi passage 50, the outer end of which is in communication with the delivery line 41. The annular space 48 is connected by radial passages 51 in the draft tube 49 to the throat 501 of the Venturi passage 50, so that the upper end of the reaction piston 30 is at all times exposed to the pressure existing in the throat 501 of the Venturi passage. Therefore, when no pressure exists in the delivery line 41, there is no pressure applied to the upper end of the reaction piston 30, and little resistance is offered to its upward movement.

Upward movement of the reaction piston 30 by the lever 38 causes the stem 29 to first engage against the head 25, and then shift the head and the stem 23 to move the poppet 22 off its seat 27. Engagement of the upper end of the stem 29 against the head 25 seals the passage 45 in the stem from the chamber 24, thereby blocking flow of fluid through the passage 42 (Fig. 1) and the chamber 43, and through the passage 45 to the return line 40. Opening of the poppet 22 off its seat 27 permits pressure fluid to flow through the passage 21 and through radial passages 55 in the element 15 into an annular chamber 56 defined between the element 15 and the bore 11, and thence through a passage 57 (Fig. 1) and through the Venturi passage 50 in the draft tube 49 to the delivery line 41, to charge the brakes.

After the poppet 22 opens, the force applied to the reaction piston 30 by the actuating lever 38 is opposed by pressure fluid acting against the upper side of the reaction piston, and the pressure applied is that existing at the throat, 501, of the Venturi passage 50 which throat is connected by the passages 51, 48, and 47 to the upper end of the bore 31 in which the reaction piston slides.

When the valve is first opened, fluid flows rapidly through the Venturi passage 50 to the delivery line 41 and through the line to the brakes, to charge the latter. By virtue of this rapid flow there may be a substantial pressure drop in the delivery line so that the pressure at the valve end of the brake line is substantially greater than the pressure at the brakes. However, the pressure at the throat of the Venturi passage 50 is reduced in proportion to the rate of flow therethrough, and by suitably proportioning the Venturi passage, the pressure recovery in the Venturi discharge can be made substantially equal to the pressure drop in the line, so that the pressure applied to the reaction piston 30 in opposition to the force exerted by the actuating lever 38 can be made to closely approximate the actual pressure simultaneously existing in the brakes. The operator, therefore, exerts enough force on the lever 38 to open the poppet valve 22 far enough to raise the pressure within the bore 11 to a relatively high value to compensate for the resistance of the brake line and cause rapid charging of the brakes.

As the brakes become charged, the rate of flow decreases and the pressure drop produced by the Venturi passage is reduced, but since the pressure drop in the delivery line is likewise reduced, the pressure applied to the reaction piston 30 remains substantially equal to the pressure existing in the brakes themselves. Therefore, irrespective of the rate of flow, the pressure applied to the reaction piston 30 is always indicative of the pressure in the brake cylinders.

When the operator releases the force on the brake pedal or the brake lever, the lever 38 is returned by the pressure acting against the reaction piston (assisted by the spring 26) resulting in, first, the closing of the poppet 22 on its seat, and then the disengagement of the upper end of the stem 29 from the head 25. Closure of the poppet 22 against its seat cuts off the supply of pressure fluid, and disengagement of the end of the stem 29 from the head 25 connects the delivery line to the exhaust line 40 through the passage 42, the chamber 43, the ports 44, the passage 45 and the ports 46, so that the brakes are released.

The Venturi passage 50 should, of course, be dimensioned according to the length and size of the line 41 leading to the brakes, since if the Venturi throat is too small, it will over-compensate for the pressure drop in the line, and if it is too large, it will fail to fully compensate. The best size for any particular installation can readily be computed or determined by experiment.

Figure 3:
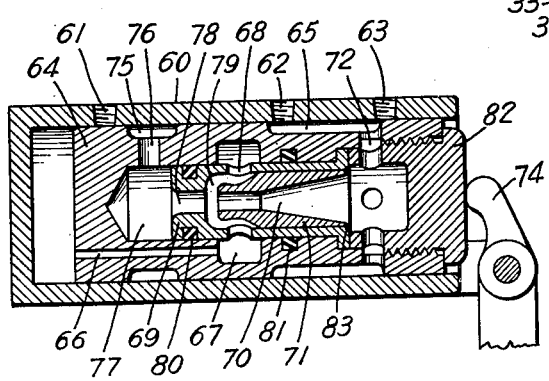
Fig. 3 is a longitudinal section through an alternative valve construction employing a Venturi passage for compensation.

In the modification shown in Fig. 3, the Venturi passage for producing the desired compensation is incorporated in a valve of different construction from that shown in Figs. 1 and 2. Thus, the valve of Fig. 3 comprises a single tubular body 60 closed at one end and open at the other end and having a pressure inlet port 61, a delivery port 62, and an exhaust port 63.

When the brake is in released position as shown in Fig. 3, the pressure port 61 is closed off by a piston 64, whereas the delivery port 62 is connected to the exhaust port 63 by an annular groove 65 in the piston 64 at such times. The left end of the piston 64 is always connected to the delivery port 62, through a passage 66 in the piston 64, an annular chamber 67 therein, ports 68 in an inner member 69, a passage 70 in a draft tube 71 in the member 69, and through radial passages 72 leading to the groove 65.

When the brakes are to be applied, an actuating lever 74 is rocked counterclockwise, forcing the piston 64 to the left. This movement first breaks communication between the exhaust port 63 and the piston groove 65, and thereafter carries an annular groove 75 in the piston 64 into communication with the pressure port 61. Pressure fluid thereupon flows from the port 61 into the annular groove 75, thence through a radial port 76 into a chamber 77 within the piston and thence through passages 78 and 79 and out through the radial ports 72 into the annular groove 65 and thence out through the delivery port 62 to the brakes.

When the brake is first applied, rapid flow occurs through the passages 78 and 79 causing a reduced pressure in the space 79, which reduced pressure is applied through the radial ports 68, the chamber 67 and the passage 66 to the left end of the piston to oppose the force exerted on the piston by the actuating lever 74. As in the embodiment shown in Figs. 1 and 2, the gain in pressure as the fluid traverses the Venturi passage defined by passages 78 and 79 compensates for the loss of pressure in the brake line during rapid flow therethrough, and as the brakes become charged and the rate of flow is decreased, the pressure remains substantially the same in the space 79 as in the brakes, so that the reaction on the piston always gives a true indication of the pressure existing in the brakes.

For convenience, the member 69 is formed as a separate element and is sealed with respect to the piston 64 by gaskets 80 and 81 and is held in place by a plug member 82 screwed into the right end of the piston. The draft tube 71 may be joined to the element 69 by brazing or welding as indicated at 83.

Figure 4:
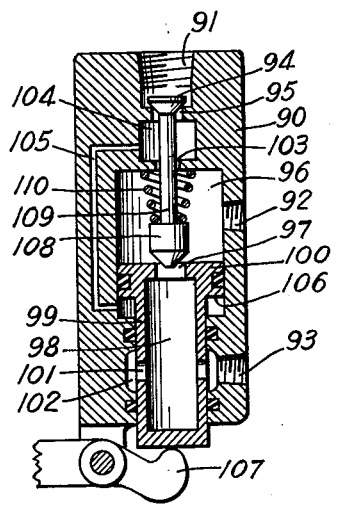
Fig. 4 is a longitudinal section showing still another embodiment of the invention employing a restriction for producing the compensation.

The embodiment shown in Fig. 4 differs from those shown in Figs. 1, 2, and 3 in that it employs a restriction, and a compensating face on the reaction piston for producing the same general effect as is produced by the Venturi passages in the previously described valves. Fig. 4 is merely a diagrammatic showing of the device, which comprises a body 90 having a pressure inlet port 91, a delivery port 92, and an exhaust port 93. When the brake is released, a poppet valve 94 is closed against a seat 95 to prevent entry of pressure fluid, and the delivery port 92 is connected through a cylinder 96 and an orifice 97 to a chamber 98 in the stem 99 of a reaction piston 100 and the chamber 98 is connected through ports 101 with an annular groove 102 in the body 90 which is in communication with the exhaust port 93. The pressure in the cylinder 96 is applied through a restricted passage 103, a chamber 104 and a passage 105 to the under side 106 of the reaction piston, so that, when the brakes are not applied, the pressures on the opposite faces of the reaction piston are substantially equal.

To apply the brakes, an actuating lever 107 is rocked counterclockwise to shift the reaction piston upwardly. Initial upward movement carries the reaction piston into engagement with a poppet 108 on the lower end of the stem 109 of the poppet 94, thereby closing the orifice 97 and interrupting communication between the delivery port 92 and the exhaust port 93. Continued upward movement of the reaction piston carries the valve stem 109 with it, against the force exerted by a compression spring 110, lifting the poppet 94 off its seat 95 and permitting pressure fluid to flow from the pressure port 91 into the chamber 104, thence through the restricted orifice 103 to the chamber 96 and out through the delivery port 92. It will be observed that with the arrangement shown in Fig. 4, the pressure applied to the upper end of the reaction piston 100 is the same as that at the brake port 92, which pressure is substantially greater than the pressure at the brakes during the charging period when the flow is rapid, and there is a substantial pressure drop in the delivery line. However, this excess force applied to the upper face of the reaction piston is compensated by pressure fluid applied to the underface 106 of the reaction piston through the passage 105, and the pressure applied to the underface 106 is greater than the pressure applied to the upper face during periods of rapid fluid flow because of the pressure drop across the orifice 103. The extent of compensation can be controlled by varying the size of the orifice 103 and by varying the area of the underside 106 of the reaction piston relative to the area of the upper end thereof. Variation of the area of the underface 106 is, of course, accomplished by varying the diameter of the stem 99 of the reaction piston. When the brakes are charged and flow substantially ceases, there is no longer a pressure drop at the orifice 103 so that the pressure applied to the underface of the reaction piston is thereafter the same as that applied to the upper face.

Although for the purpose of explaining the invention certain embodiments thereof have been described in detail it will be apparent that various modifications can be made from the specific structure shown without departing from the invention and the latter is to be limited only to the extent set forth in the appended claims.

I claim:

1. A valve of the type described comprising: a body member having a pressure port adapted to be connected to a source of fluid pressure, a delivery port adapted to be connected through a line to pressure-responsive apparatus, and an exhaust port; a control member; valve means in said body movable by said control member from a first position, in which said delivery port is connected to said exhaust port, into a second position in which said delivery port is disconnected from said exhaust port and connected to said pressure port; a reaction piston associated with and movable with said control member; mean responsive to pressure in said delivery port for applying a force to said reaction piston opposing movement thereof by said control member; and means responsive to the rate of flow of fluid through said delivery port for partially neutralizing said first-mentioned force.

2. A valve of the type described comprising: a body member having a pressure port adapted to be connected to a source of fluid pressure, a delivery port adapted to be connected to pressure-responsive apparatus, and an exhaust port; valve means in said body movable from a first position, in which it connects said delivery port to said exhaust port, into a second position in which said delivery port is disconnected from said exhaust port and connected to said pressure port; a reaction piston associated with and movable with said valve means; means for applying pressure fluid to said reaction piston to oppose movement thereof from said first position to said second position; and means responsive to increase in the rate of fluid flow through said valve from said pressure port to and through said delivery port for reducing the pressure applied to said reaction piston relative to the pressure at said delivery port.

3. A valve of the type described comprising: a body member having a pressure port adapted to be connected to a source of fluid pressure, a delivery port adapted to be connected to pressure-responsive apparatus, and an exhaust port; valve means in said body movable from a first position, in which said delivery port is connected to said exhaust port, into a second position in which said delivery port is disconnected from exhaust port and connected to said pressure port; a reaction piston associated with and movable with said valve means; means forming a fluid connection between said delivery port and said reaction piston to oppose movement thereof from said first to said second positions; said fluid connection means including a Venturi passage for conducting fluid between said pressure port and said delivery port, and means for applying the pressure at the throat of the Venturi passage to said reaction piston.

4. A valve of the type described comprising: a body member having a pressure port adapted to be connected to a source of fluid pressure, a delivery port adapted to be connected to pressure-responsive apparatus, and an exhaust port; a manual control member; valve means in said body movable by said control member from a first position, in which said delivery port is connected to said exhaust port, into a second position in which said delivery port is disconnected from said exhaust port and connected to said pressure port; a reaction piston associated with and movable by said control member; means for applying pressure fluid to said reaction piston to oppose movement thereof by said control member; and means responsive to the rate of fluid flow through said valve from said pressure port to and through said delivery port for reducing the pressure applied to said reaction piston relative to the pressure at said delivery port in response to increase of the rate of flow through said valve.

5. A valve of the type described comprising: a body member having a pressure port adapted to be connected to a source of fluid pressure, a delivery port adapted to be connected to pressure-responsive apparatus, and an exhaust port; a control member; valve means in said body movable by said control member from a first position, in which said delivery port is connected to said exhaust port, into a second position in which said delivery port is disconnected from said exhaust port and connected to said pressure port; a reaction piston associated with and movable by said control member; said reaction piston having a first face exposed to the pressure in said delivery port for opposing movement of the piston by said control member, and having a second smaller opposite face, and means responsive to the rate of fluid flow through said valve from said pressure port to said delivery port for applying a pressure to said second face that is proportional to the rate of fluid flow through said valve.

6. A valve as described in claim 5 in which said means for applying said pressure proportional to the rate of flow through the valve comprises flow-restricting means between said pressure port and said supply port.

7. A valve of the type described comprising: a body member having a first bore extending thereinto and means for supplying pressure fluid to the outer end of said bore; means defining a partition in said bore having a valve seat; a poppet valve adapted to close against the pressure side of said seat; a second bore in said body the outer end of which constitutes a delivery port adapted to be connected to pressure-responsive apparatus; a draft tube defining a Venturi passage in said second bore; passage means connecting the inner end of said second bore to said first bore on the inner side of said partition therein; a third bore in said body aligned with and opposite to said first bore; a reaction piston slidable in said third bore, and means responsive to movement of said reaction piston into said third bore for opening said poppet valve; an exhaust port; valve means for communicating said delivery port with said exhaust port when said poppet is seated and breaking said communication when said poppet is opened; and means communicating the throat of said Venturi passage with the inner end of said third bore.

8. A valve of the type described comprising: a body member having a bore therein and a piston reciprocal in said bore; a pressure port; a delivery port, and an exhaust port communicating with said bore at longitudinally-spaced points therein; a pair of ports on the surface of said piston adapted to communicate said delivery port with said exhaust port and close off said pressure port in a normal position of said piston, and to interrupt communication with said exhaust port in response to movement of the piston out of normal position; a Venturi passage within said piston having one end in constant communication with said delivery port and adapted to have its other end communicated with said pressure port in response to movement of said piston out of normal position; and passage means communicating the throat of said Venturi passage with one end of said piston for applying the pressure existing at the throat of the Venturi passage to said piston to oppose movement thereof out of said normal position.

9. A valve of the type described comprising: a body member defining a cylinder; a piston in said cylinder having a stem extending through one end of said cylinder, a pressure port communicating with the end of said cylinder opposite said piston stem; a poppet valve actuated by movement of said piston toward said pressure port for communicating said pressure port with said other end of said cylinder, a delivery port communicating with said one end of said cylinder, means defining a restricted orifice between said poppet valve and said other end of said cylinder; and passage means communicating said one end of said piston with said passage intermediate said poppet valve and said orifice; and means for shifting said piston toward said one end of said cylinder to open said poppet valve.

10. A valve of the type described comprising: a body member having a pressure port adapted to be connected to a source of fluid under pressure, and a delivery port adapted to be connected to a delivery line; a valve movable to control flow from said pressure port to said delivery port; means for applying an opening force to said valve; means defining a fluid chamber having a movable wall connected to said means for applying an opening force to said valve; means responsive to pressure in said delivery port for applying fluid pressure to said chamber; and means responsive to the rate of flow of fluid through said valve and out of said delivery port for partially neutralizing the force of the fluid pressure in said chamber; the connection between said movable wall and said means for applying an opening force to said valve, being such that fluid pressure in said chamber urges said movable wall in direction to oppose opening movement of said valve.

11. A valve of the type described comprising: a body member having a pressure port adapted to be connected to a source of fluid under pressure, and a delivery port adapted to be connected to a delivery line; a valve movable to control flow from said pressure port to said delivery port; actuating means movable in opposite directions; pressure-responsive means connected to said actuating means for opposing movement of the latter in one direction; means responsive to movement of said actuating means in said one direction for opening said valve to permit fluid flow from said pressure port to said delivery port; means responsive to pressure in said delivery port for applying fluid pressure to said pressure-responsive means to oppose movement of said actuating means in said one direction; and means responsive to the rate of flow of fluid to and through said delivery port for reducing the fluid pressure applied to said pressure-responsive means.

12. A valve of the type described comprising: a body member having a pressure port adapted to be connected to a source of fluid under pressure, and a delivery port adapted to be connected to a delivery line; a valve movable to control flow from said pressure port to said delivery port; actuating means movable in opposite directions; pressure-responsive means connected to said actuating means for opposing movement of the latter in one direction; means responsive to movement of said actuating means in said one direction for opening said valve to permit fluid flow from said pressure to said delivery port; passage means including a Venturi passage between said valve and said delivery port; and means connecting the throat of said Venturi passage to said pressure-responsive means.

13. A valve as described in claim 1 in which the means responsive to the rate of fluid flow through said delivery port comprises a fluid conductor of reduced cross-sectional area between said pressure port and said delivery port.

14. A valve as described in claim 2 in which said means responsive to increase in the rate of fluid flow through said delivery port comprises a fluid conductor of reduced cross-sectional area between said pressure port and said delivery port.

15. A valve as described in claim 4 in which said means responsive to rate of fluid flow through said valve from said pressure port to said delivery port comprises a fluid conductor of reduced cross-sectional area.

16. A valve as described in claim 10 in which said means responsive to rate of flow of fluid through said valve and out of said delivery port comprises flow restricting means.

17. A valve as described in claim 11 in which said means responsive to the rate of flow of fluid to and through said delivery port for reducing the fluid pressure applied to said pressure responsive means comprises a fluid conductor of reduced cross-sectional area.

SYDNEY E. WESTMAN.

REFERENCES CITED

The following references are of record in the file of this patent:

UNITED STATES PATENTS

| Number | Name | Date |
|---|---|---|
| 1,657,531 | Farmer | Jan. 31, 1928 |
| 2,133,275 | Andres et al. | Oct. 18, 1938 |
| 2,273,953 | Gorman | Feb. 24, 1942 |